United States Patent [19]
Lankenau

[11] 3,764,164
[45] Oct. 9, 1973

[54] CONVERTER DOLLY WITH SLIDEABLE FIFTH WHEEL FOR USE IN COMBINATION WITH TRACTOR-TRAILER RIGS

[76] Inventor: Richard F. Lankenau, 1207 Bonita Ave., Mountain View, Calif. 94040

[22] Filed: Jan. 24, 1972

[21] Appl. No.: 220,124

[52] U.S. Cl. ......... 280/415 B, 280/408, 280/423 A, 280/407, 280/476 R
[51] Int. Cl. .......................................... B62d 53/06
[58] Field of Search .................... 280/415 B, 423 A, 280/476 R, 407

[56] References Cited
UNITED STATES PATENTS

| | | | |
|---|---|---|---|
| 3,421,778 | 1/1969 | Barker et al. | 280/415 B X |
| 3,484,852 | 12/1969 | Norrie et al. | 280/415 B X |
| 3,413,015 | 11/1968 | Fontaine | 280/415 B |
| 2,714,016 | 7/1955 | Smith | 280/423 A X |

FOREIGN PATENTS OR APPLICATIONS

| | | | |
|---|---|---|---|
| 1,032,031 | 6/1966 | Great Britain | 280/423 A |

*Primary Examiner*—Leo Friaglia
*Attorney*—Julian Caplan

[57] ABSTRACT

Some trailers are supported by a dolly having a towing tongue for attachment to the rear of the towing trailer. In these installations, the fifth wheel of the dolly, which supports the weight of the forward end of the trailer, is preferably located directly above the dolly axle. Semi-trailers which are very heavily loaded (a situation which is increasingly common with use of containerized cargo) require two rear axles on the tractor, but many tractors have a single rear axle. A desirable means for converting such tractors is to couple a dolly close to the rear wheel in such manner that the dolly becomes a part of the tractor and is not pivotal relative thereto. In accordance with the invention, the tractor and dolly frame are coupled together. In such instances, the regular fifth wheel of the tractor is too far forward to support the trailer. To support the load properly, the fifth wheel of the dolly is used. In accordance with this invention, the dolly fifth wheel is made slideable forwardly on the dolly frame between a rear position over the dolly axle to a forward position midway above the dolly axle and tractor axle to a forward position midway above the dolly axle and tractor axle when the dolly is close-coupled to the tractor. Alternatively, two fifth wheels may be permanently fixed on the dolly.

5 Claims, 6 Drawing Figures

PATENTED OCT 9 1973 3,764,164

CONVERTER DOLLY WITH SLIDEABLE FIFTH WHEEL FOR USE IN COMBINATION WITH TRACTOR-TRAILER RIGS

This invention relates to a new and improved convertor dolly for semi-trailers and tractors which is characterized by the fact that the dolly has a fifth wheel mounted thereon which is movable between two positions or has two fifth wheels spaced longitudinally of each other. In one use of the dolly, the rear fifth wheel is positioned over the axle of the dolly and is used to support the forward end of a trailer in such manner that the dolly is used to tow the trailer behind another trailer. In another use for the dolly, the fifth wheel is forwardly of the first-mentioned position and the dolly is close coupled to the rear of a tractor to provide in effect a second rear axle for the tractor. The forward end of a semi-trailer is supported by the dolly's fifth wheel at a location substantially midway between the regular rear axle of the tractor and the dolly axle.

A principal advantage of the invention is that it provides a dolly which is versatile in that it can be used either with trailer trailers behind another trailer or supported at the rear of the tractor. Hence this invention makes it possible to reduce the amount of equipment required in a trucking fleet.

Another feature of the versatility of the dolly is the fact that return loads which are made up at a remote point and differ from the outgoing loads may be made up without deadheading equipment unnecessarily.

Still another feature of the invention is the ease with which the dolly can be converted from one type of use to the other. Further, a conventional two-axle tractor can readily be converted to a three-axle tractor by attaching the dolly. A coupling is accomplished with a minimum of labor and with great safety which permits relative vertical movement of tractor and dolly. Still another feature of the invention is the rapidity and ease with which the dolly fifth wheel can be moved between various positions of use.

Other objects of the present invention will become apparent upon reading the following specification and referring to the accompanying drawings in which similar characters of reference represent corresponding parts in each of the several views.

Figure 1:
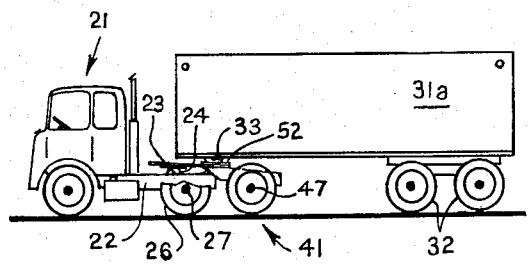
FIG. 1 is a schematic side elevational view showing the dolly of the present invention coupled to a tractor and used to support a semi-trailer which is heavily loaded.

The present invention may be used in connection with a towing vehicle such as a tractor 21 of conventional two-axle construction having longitudinal side frame members 22 interconnected by transverse horizontal ties 28 at intervals along the length of the members 22. It is one of the features of the present invention that the number of ties 28 does not have to be reduced as is necessary in certain prior art constructions. Frame members 22 support a conventional fifth wheel 23 which is secured thereto by brackets 24. In ordinary use, fifth wheel 23 couples to the kingpin (not shown) of trailer 31a. In accordance with this invention, the fifth wheel 23 also couples to kingpin 62 of dolly 41. The fifth wheel 23 of the tractor 21 is not longitudinally movable, thereby distinguishing over some prior art fifth wheel constructions. Tractor 21 has rear wheels 26 supporting the tractor by means of axle 27.

In FIG. 1 a semi-trailer 31a is illustrated which has rear wheels 32 on one or two axles and has a front support 33 of the king-pin type which is used to couple to a fifth wheel. At present, because of the use of containerized cargo and other heavy loads, the weight of semi-trailers 31a has become so great that a single rear axle 27 will not safely support the load. On the other hand, tractors 21 having two rear axles are quite expensive and many times unnecessary when the load is not so heavy as to require two rear axles. The present invention is used with a heavy, large semi-trailer such as semi-trailer 31a shown in FIG. 1 and uses two-axle tractors 21.

Figure 2:
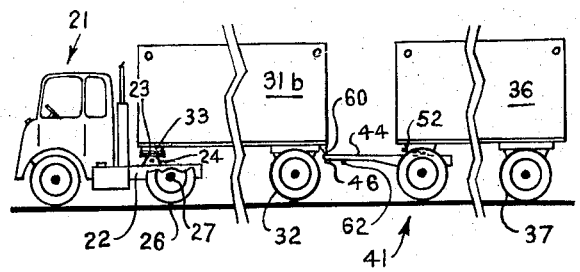
FIG. 2 is a view similar to FIG. 1, partly broken away to conserve space, showing the dolly used to support the forward end of a trailer by towing from a preceding trailer.

In FIG. 2 a shorter, or less heavy, semi-trailer 31b is shown drawn by tractor 21 without the use of the dolly. The front support 33 of trailer 31b is coupled to the fifth wheel 23 of the tractor 21 in FIG. 2, whereas it is observed in FIG. 1 that the normal fifth wheel 23 of the tractor 21 is not used to support the trailer but is used to secure dolly 41 in place. On the contrary, in FIG. 1 dolly 41 is used along with the tractor 21 to support the trailer 31a, whereas in FIG. 2 the dolly 41 is used to support a separate trailer 36 having a rear axle 37 and a front support 38 which is supported by the dolly 41 so that the trailer 36 is towed behind the trailer 31b. A comparison of FIG. 1 and FIG. 2 will show the versatility of the dolly 41.

Figure 3:
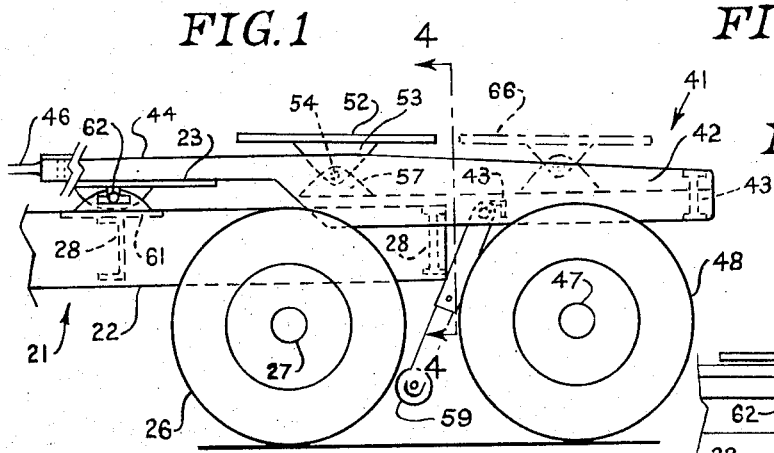
FIG. 3 is an enlarged fragmentary side elevational view partly broken away in section showing the dolly close-coupled to the rear of a tractor.
Figure 4:
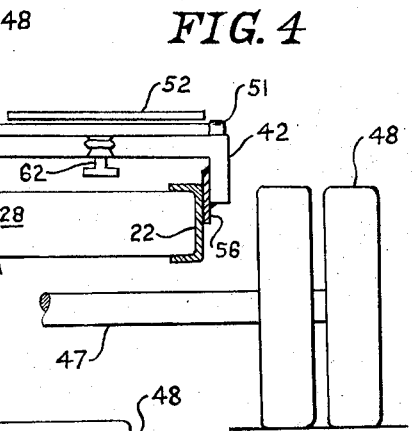
FIG. 4 is a fragmentary sectional view taken substantially along the line 4—4 of FIG. 3.
Figure 5:
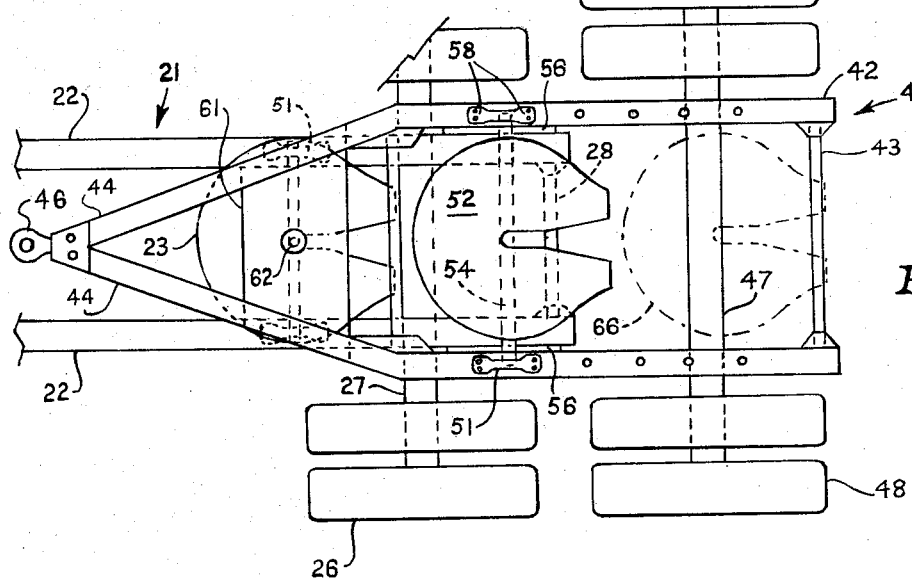
FIG. 5 is a top plan of the structure of FIG. 3.

Dolly 41 is constructed having longitudinal frame members 42 which are spaced wider apart than the frame members 22 of tractor 21 so that they may overlap the same as it best shown in FIG. 4. Plates 56 are fixed to longitudinal members 42 and between members 42 and 22 to absorb rubbing wear and hold the members in alignment. The members 42 are connected together at spaced intervals by transverse ties 43 which are preferably located above the elevation of members 22 and ties 28. However, as is shown in FIG. 4, the lower edges of plates 56 are in close contact with members 22 so that when the dolly is coupled to the tractor, as shown in FIGS. 3–5, there is no possibility that the dolly 41 can get out of parallel relationship to the tractor 21. The forward ends of longitudinal members 42 are connected to forwardly converging frame members 44 which terminate at the front in a towing eye 46 which is used in FIG. 2 to couple the dolly 41 to the rear of a trailer or otherwise to tow the dolly and the load supported by the dolly. Dolly 41 has a transverse axle 47 supported thereby in a manner not herein illustrated but well understood in the trailer art. Axle 47 is supported by wheels 48 which preferably have the same spacing as the wheels 26.

Mounted on dolly 41 is a conventional fifth wheel 52 which is illustrated schematically in the accompanying drawing and has depending therefrom fifth wheel brackets 53 through which extends transverse pivot shaft 54. Shaft 54 is journalled in pillow blocks 51 mounted on top of members 42. The pivotal mounting permits the angle which the fifth wheel 52 assumes with respect to the dolly 41 to alter during the coupling operations and when the load is towed on hilly terrain.

In FIG. 2 it will be observed that fifth wheel 52 of dolly 41 is directly over axle 41 so as properly to support the weight of the trailer 36. However, in FIG. 1 the fifth wheel 52 is located forwardly of axle 47 and approximately midway between axles 27 and 47 so that the load of the trailer 31a is substantially equally divided between the axles 27 and 47. One means for shifting the fifth wheel 52 between its two positions is shown. Thus pillow blocks 51 are not fixed to members 42 but may be shifted forward or rearward and bolted into desired position by bolts 58 fitting into a series of longitudinally spaced holes in members 42.

Between uses, the dolly 41 may be supported by a landing gear 59 which is retractable or pivotable in a manner well understood in the trucking industry. When a dolly is coupled to a trailer 36 as shown in FIG. 2, the landing gear 59 is raised and the towing eye 46 is connected to a hook 60 on the back of trailer 31b or some other location.

When the dolly 41 is to be close coupled to a tractor 21, the tractor is backed into position so that the longitudinal members 22 are immediately inside members 42. The converging members 44 carry a transverse plate 61 which has a king pin 62 on its lower surface which locks into fifth wheel 23 and hold the dolly in position.

When it is necessary to move the fifth wheel 52, the lock bolts 58 are removed and the fifth wheel 52 is brought into latching engagement with the front support 33 of trailer 31a. When the trailer 31a remains stationary and the tractor 21 is moved forwardly or rearwardly as the circumstances require, the fifth wheel pillow blocks 51 slide on members 42 to the proper position whereupon the lock bolts 58 are reinstalled and the dolly 41 is in proper condition for use.

It will be understood that the locking bolts 58 herein illustrated are very simple in construction, but other means such as spring pressed latches may be substituted.

Figure 6:
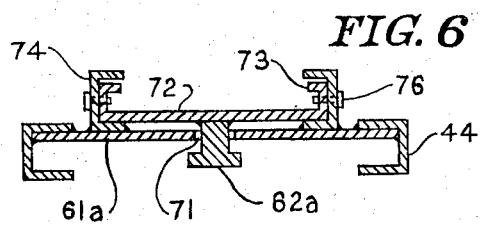
FIG. 6 is a transverse vertical section of a modification.

Instead of the fifth wheel 52 being slidable longitudinally of the dolly, it may be fixed in forward position and a second fifth wheel 66 fixed in the rearward position. The fifth wheels 52 or 66 may be used alternately. Directing attention to FIG. 6, in certain instances the location of the fifth wheel 23 is not proper for the location of the kingpin 62 to make a proper coupling. In such instances, as shown in FIG. 6, the plate 61a is formed with a longitudinally elongated slot 71 through which the kingpin 62a projects. On the top of plate 61a are longitudinally extending channels, or ways, 74. The upper end of kingpin 62a is fixed to plate 72 which has upstanding flanges 73 which slide inside the channel 74. Thus, the kingpin 62a may be moved forwardly and rearwardly within the limits of the length (approximately 8 inches) of slot 71. It is held in its various positions of adjustment by pins 76 which fit into aligned holes in channels 74 and flanges 73. Thus the pin 62a is located longitudinally relative to dolly 41 so that it will properly latch in the fifth wheel 23 when the dolly is coupled to the tractor as shown in FIGS. 1 and 3.

What is claimed is:

1. In combination with a tractor a dolly having first longitudinally extending frame members spaced apart, transverse frame members interconnecting said first longitudinal members, a first axle supporting said frame members, wheels on said first axle, a tow bar at the front of said dolly fixed in position relative to said first longitudinal members, a fifth wheel having a kingpin receiving opening, a fifth wheel base to which said fifth wheel is connected, longitudinally extending supports fixed to said first longitudinal frame members and slidably supporting said fifth wheel base for movement longitudinally of said dolly, first lock means selectively securing said base to said supports in at least two longitudinally spaced locations, in one said location said kingpin opening being substantially directly over said first axle, and in a second said location said kingpin opening being forwardly of said first axle, said tractor having second longitudinal members at approximately the same elevation as said first longitudinal members, a second axle supporting the rear of said second longitudinal members, said first longitudinal members being disposed immediately outwardly of and partially overlapping said second members and extending alongside said second longitudinal members for a substantial distance to prevent relative pivotal movement between said longitudinal members, and second lock means securing said first and second longitudinal members together with said second axle ahead of said first axle, said second lock means being detachable to permit said dolly to slide off said tractor in a longitudinal direction.

2. The combination according to claim 1 wherein said tow bar is provided with ways and which further comprises a plate, said kingpin being fixed slidable longitudinally in said ways, and third lock means for locking said plate relative to said ways in different positions of adjustment.

3. The combination according to claim 1 in which said tractor supports a second fifth wheel ahead of said dolly.

4. The combination according to claim 3 in which said second fifth wheel is fixed relative to said tractor.

5. The combination according to claim 1 in which said tractor is provided with a plurality of transverse ties at least one said transverse tie being located in close proximity to the rear of said tractor.

* * * * *